(12) United States Patent
Corwin

(10) Patent No.: US 6,696,642 B1
(45) Date of Patent: Feb. 24, 2004

(54) WIRING INSTALLATION DEVICE

(75) Inventor: James E. Corwin, Jefferson City, MO (US)

(73) Assignee: EZ-Cap Enterprises, LLC, Jefferson City, MO (US)

(*) Notice: Subject to any disclaimer, the term of this patent is extended or adjusted under 35 U.S.C. 154(b) by 0 days.

(21) Appl. No.: 10/283,764

(22) Filed: Oct. 30, 2002

(51) Int. Cl.⁷ .................................................. H02G 3/08
(52) U.S. Cl. ............................ 174/50; 174/48; 174/58; 220/3.2; 220/3.3; 33/528; 33/DIG. 10
(58) Field of Search ........................... 174/50, 48, 49, 174/53, 58, 54, 65 R, 65 G, 66, 68.1, 135; 220/3.2, 3.3, 3.4, 3.5, 3.7, 3.8, 4.01, 4.02; 248/906, 343; 33/DIG. 10, 528

(56) References Cited

U.S. PATENT DOCUMENTS

| | | |
|---|---|---|
| 1,066,706 A | 7/1913 | Caine |
| 2,130,307 A | 9/1938 | McGovern |
| 2,459,659 A | 1/1949 | Kolb |
| 2,670,919 A | 3/1954 | Esoldi |
| 2,809,002 A | 10/1957 | Rudolph |
| 3,619,476 A * | 11/1971 | Rasmussen ............... 174/58 |
| 4,041,238 A | 8/1977 | Penczak |
| 4,778,134 A * | 10/1988 | Struthers et al. ......... 248/27.1 |
| 4,909,405 A | 3/1990 | Kerr, Jr. |
| 5,074,515 A | 12/1991 | Carter, Jr. |
| 5,183,233 A | 2/1993 | LaPalomento |
| 5,303,894 A | 4/1994 | Deschamps et al. |
| 5,388,795 A * | 2/1995 | Struthers et al. ......... 248/27.1 |
| 5,448,011 A * | 9/1995 | Laughlin ..................... 174/48 |
| 5,573,321 A * | 11/1996 | Bell, Jr. ...................... 174/48 |
| 5,721,394 A * | 2/1998 | Mulks ......................... 174/48 |
| 5,773,757 A * | 6/1998 | Kenney et al. ............. 174/53 |
| 5,954,304 A * | 9/1999 | Jorgensen ................. 248/343 |
| 6,005,190 A | 12/1999 | Stark et al. |
| 6,323,424 B1 * | 11/2001 | He ............................. 174/58 |
| 6,437,241 B1 * | 8/2002 | Neujahr ..................... 174/58 |
| 2003/0051894 A1 | 3/2003 | Westlake |

* cited by examiner

Primary Examiner—Dean A. Reichard
Assistant Examiner—Angel R. Estrada
(74) Attorney, Agent, or Firm—Barnes & Thornburg

(57) ABSTRACT

A wiring installation device for installing wiring in a facility is disclosed. The wiring installation device comprises a cover support unit to be attached to the frame of the facility and extend in a hole provided in a wall of the facility. A cover of the wiring installation device is configured to cover the hole provided in the wall.

17 Claims, 9 Drawing Sheets

WIRING INSTALLATION DEVICE

BACKGROUND

The present disclosure relates to installation of wiring in a facility before attachment of the wiring to a system to receive a service from the wiring.

Facilities (e.g., homes and other buildings) often include wiring. The wiring may be installed in the facility to provide a variety of services (e.g., audio signals, video signals, data transmission) to a system (e.g., audio system, video system, security system, computer system). In some cases, the wiring and the system are installed in the facility and attached to one another at about the same time, such as during construction of the facility. In other cases, the wiring is installed in the facility well before installation of the system in the facility; that is, the facility is "pre-wired" to accommodate subsequent installation of the system.

SUMMARY

A wiring installation device for installing wiring in a facility to facilitate subsequent identification of the location of the wiring for attachment of the wiring to a system to provide a service to the system is disclosed. The wiring installation device comprises a cover support unit, a cover, and a wiring retainer. The cover support unit is configured to be attached to a pair of frame members of the facility and to extend behind the rear side of a wall of the facility and into a wall hole provided in the wall. The cover is configured for movement relative to the cover support unit between a covered position in which the cover is attached to the cover support unit and covers the wall hole adjacent the front side of the wall before attachment of the wiring to the system and an uncovered position in which the cover uncovers the wall hole for attachment of the wiring to the system. The wiring retainer is attached to or configured to be attached to the cover support unit or the cover to retain the wiring adjacent the wall hole.

According to an aspect of the disclosure, the cover support unit comprises a support mount and a cover support. The support mount is configured to be attached to the pair of frame members and to extend behind the rear side of the wall. The cover support is attached to the support mount to extend in the wall hole. The cover is attached to the cover support in the covered position. The wiring retainer is attached to the cover support to retain the wiring adjacent the wall hole.

According to another aspect of the disclosure, the wiring retainer is attached to the cover. The wiring retainer is configured to retain the wiring adjacent the wall hole when the cover is positioned in its covered position before attachment of the wiring to the system and to pull the wiring relative to the wall hole when the cover is moved from its covered position to its uncovered position for attachment of the wiring to the system.

The above and other features of the present disclosure will become apparent from the following description and the attached drawings.

DETAILED DESCRIPTION OF THE DRAWINGS

Figure 1:
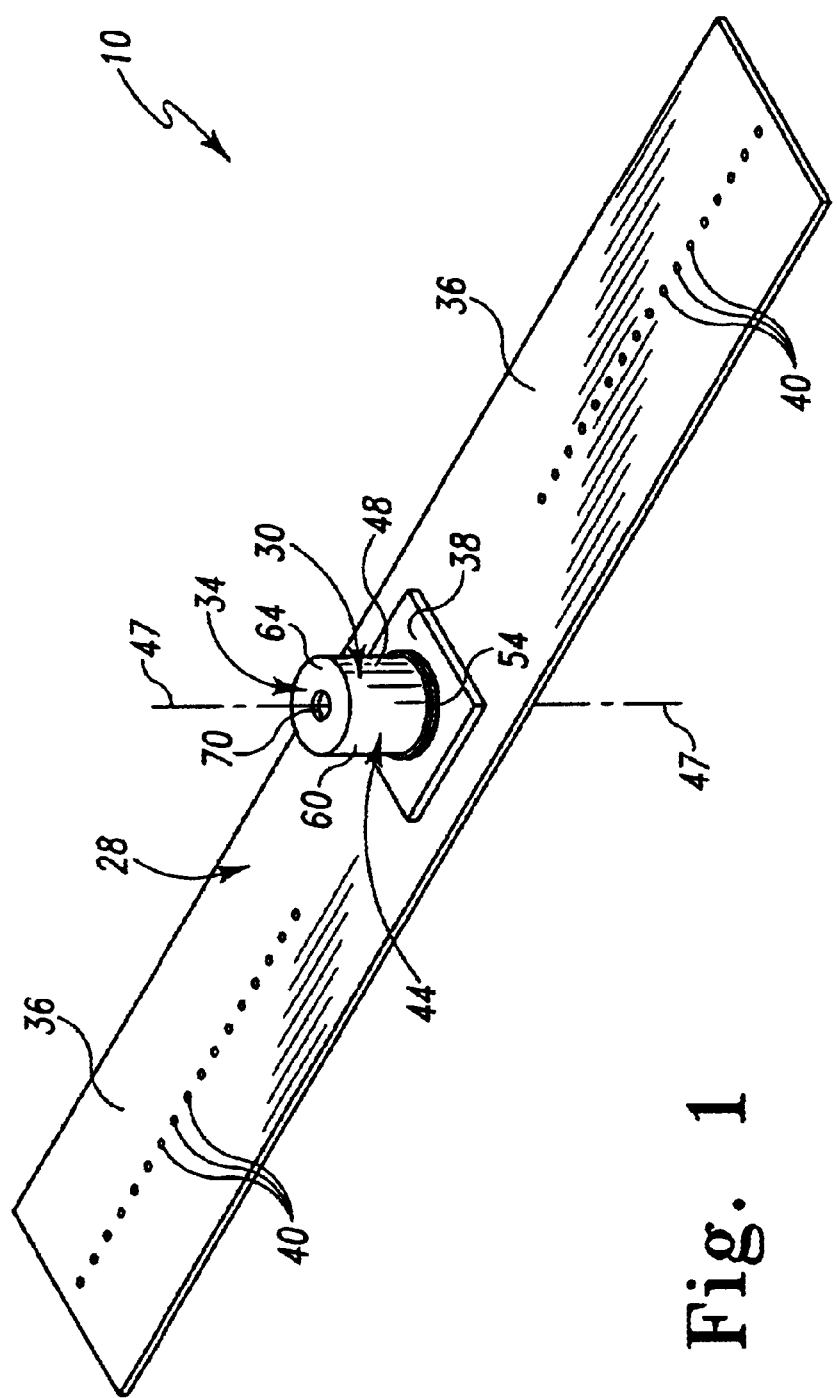
FIG. 1 is a perspective view of a wiring installation device.
Figure 2:
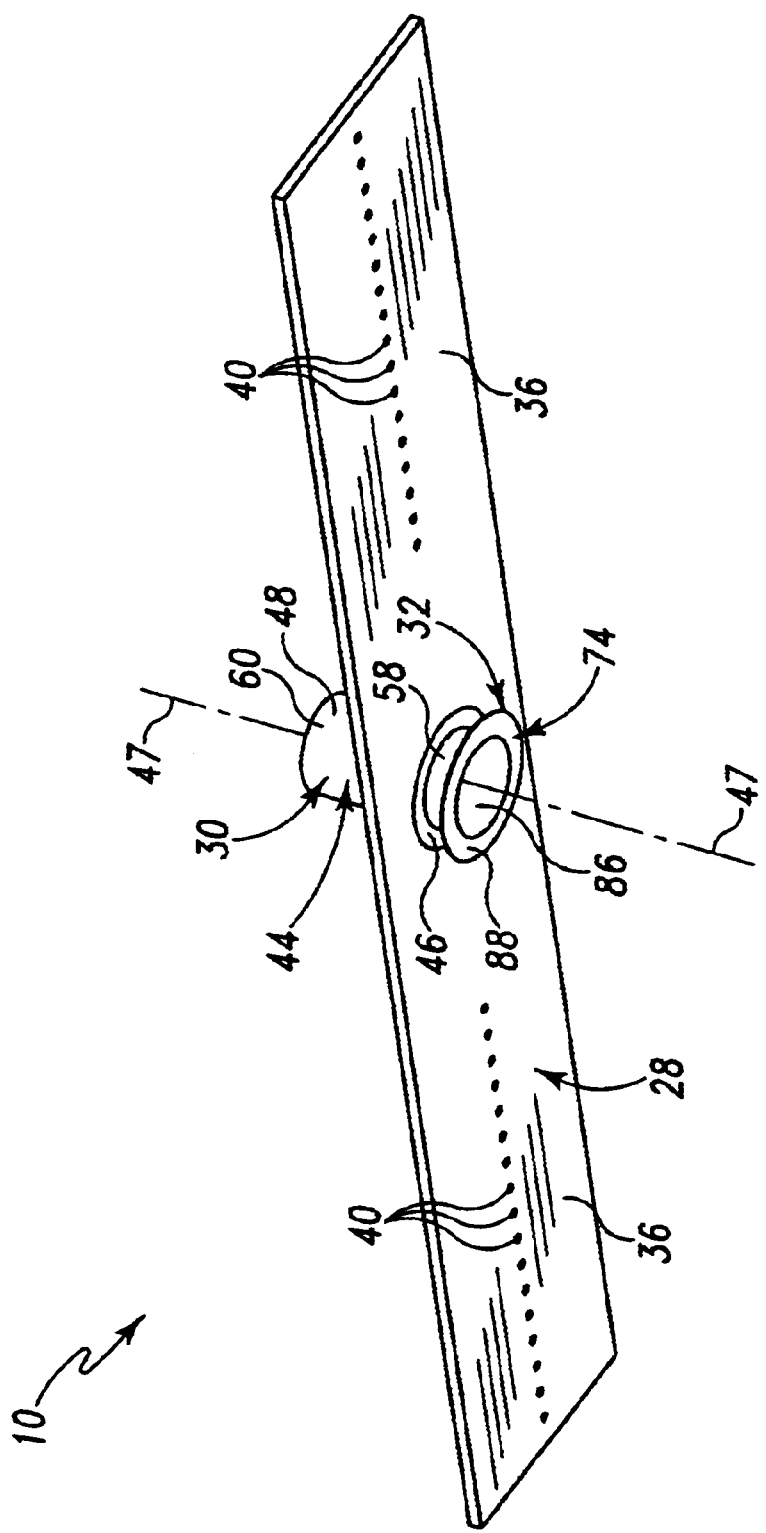
FIG. 2 is another perspective view of the wiring installation device.
Figure 3:
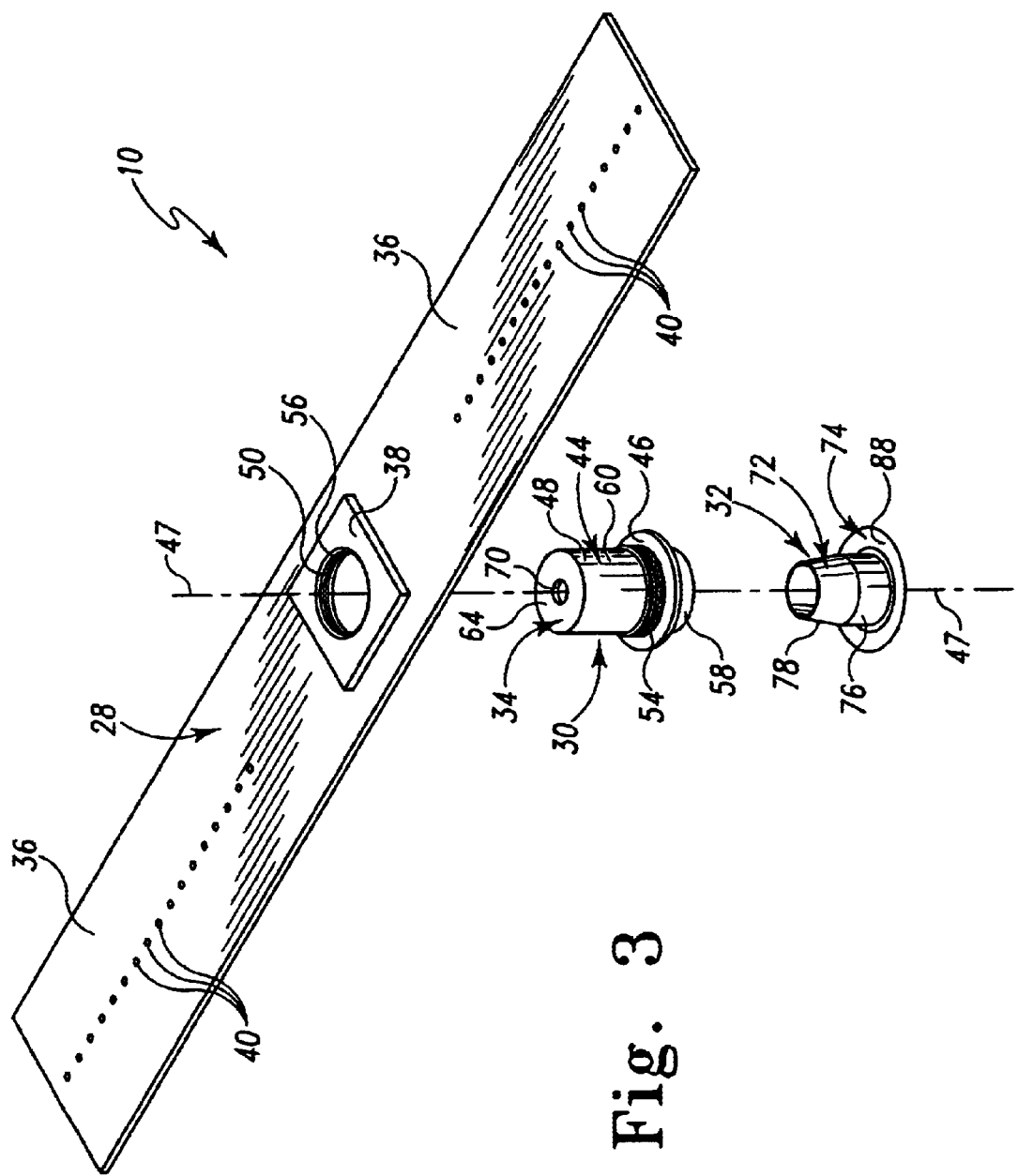
FIG. 3 is an exploded perspective view of the wiring installation device.

A wiring installation device 10 for installing wiring 12 in a facility is shown in FIGS. 1–3. The device 10 is used to install the wiring 12 in the facility to "pre-wire" the facility and to facilitate identification of the location of the wiring 12 after installation of the wiring 12 for attachment of the wiring 12 to a system (not shown) to provide a service to the system. The wiring 12 may be used to provide, for example, audio signals, video signals, data transmission, and/or the like to the system. The system may be, for example, an audio system, a video system, a security system, a computer system, and/or the like.

Figure 5:
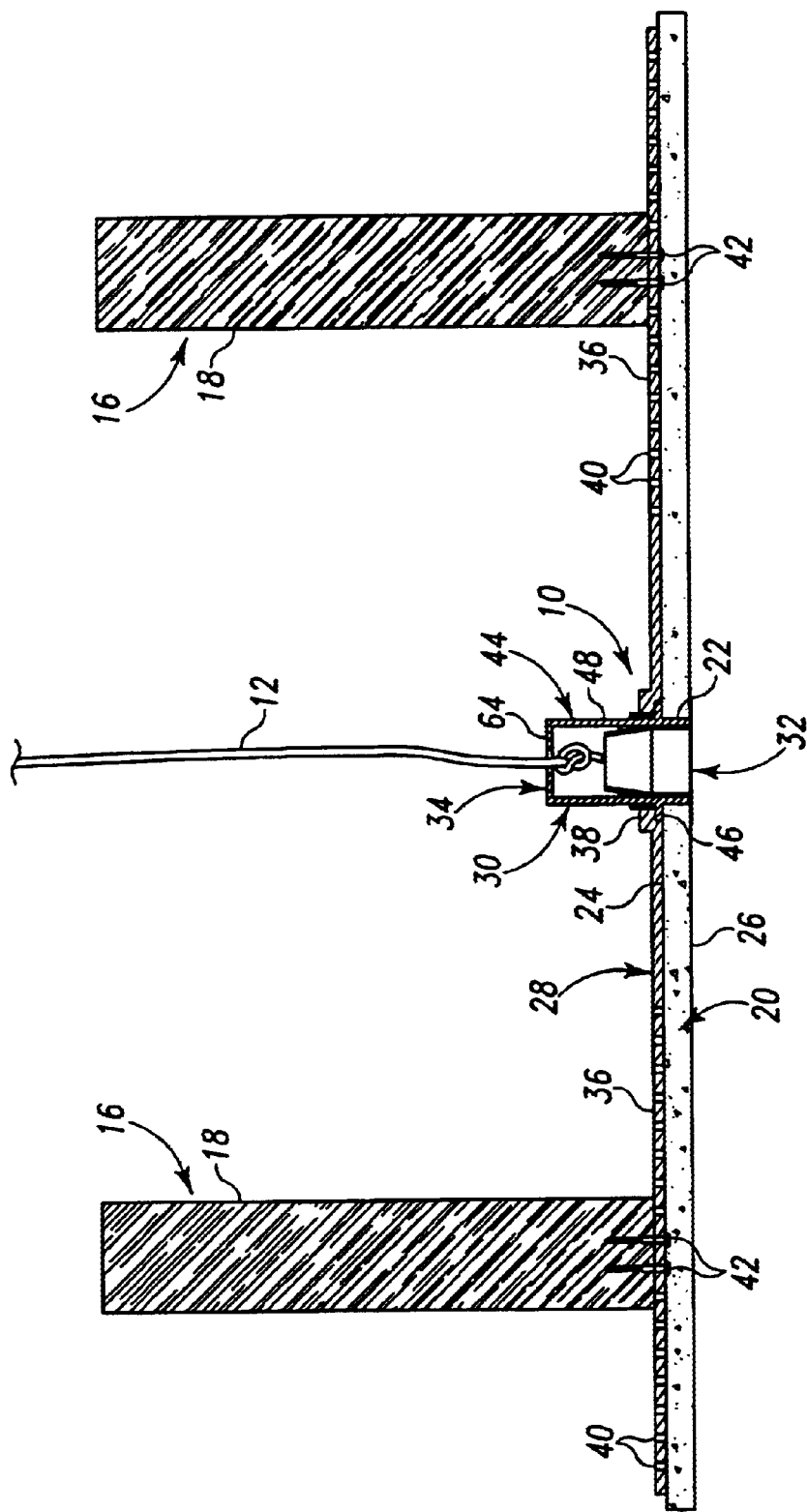
FIG. 5 is a sectional view showing the wiring installation device attached to a pair of frame members and retaining wiring adjacent a hole provided in a wall.

The facility comprises a frame 16. The frame 16 comprises a plurality of frame members 18, a pair of which is shown in FIG. 5. The frame members 18 may be, for example, ceiling joists, floor joists, wall studs, and/or the like. The frame members 18 may be parallel or non-parallel. The wiring installation device 10 is configured to be attached to the frame members 18 as explained in more detail herein.

The facility further comprises a wall 20 attached to the frame 16. The wall 20 may be made of, for example, sheetrock (as suggested in FIGS. 5–6), wood, and/or other wallboard material. The wall 20 provides a wall hole 22 extending between a rear side 24 of the wall 20 and a front side 26 of the wall 20. The wiring installation device 10 is configured to extend into the wall hole 22 and to retain the wiring 12 adjacent the wall hole 22 as explained in more detail herein.

Figure 6:
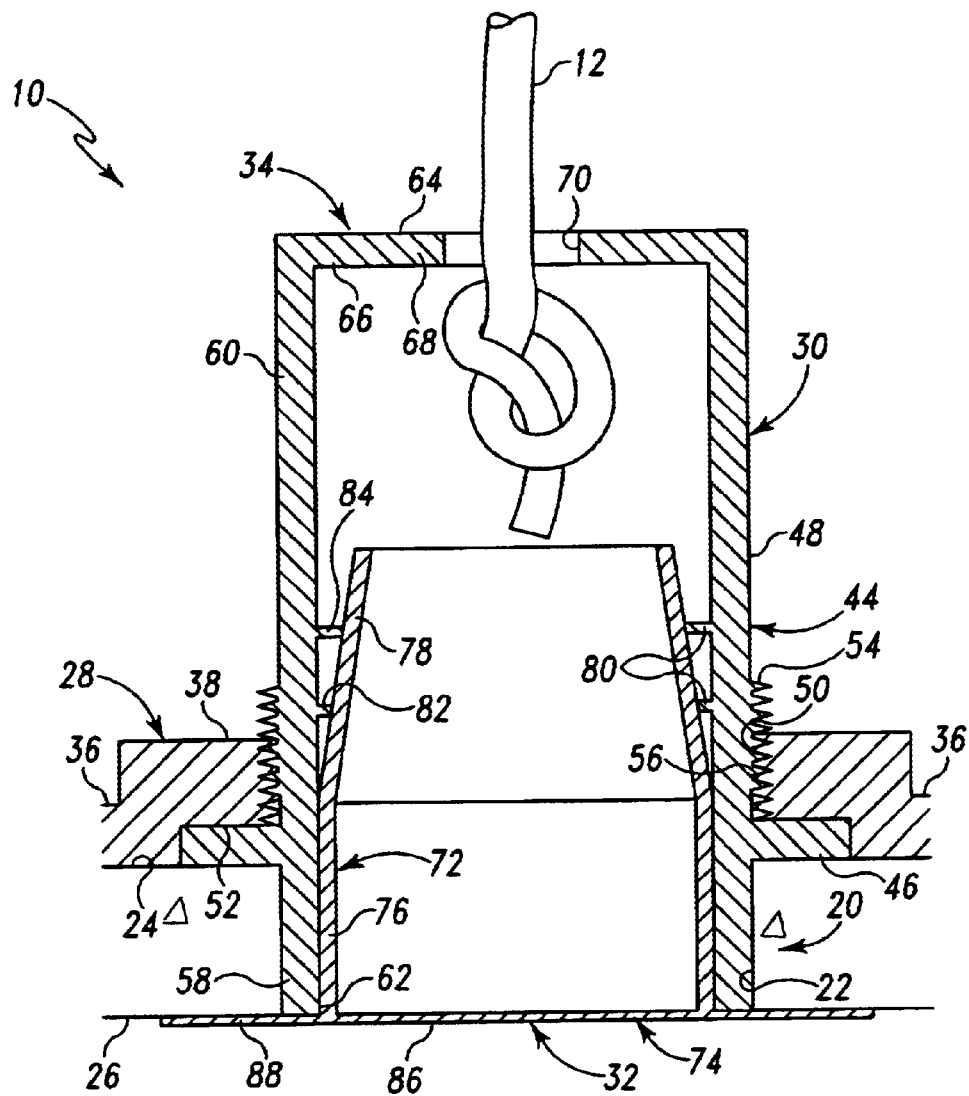
FIG. 6. is an enlarged sectional view of a detail of FIG. 5 showing the wiring retained by a wiring retainer which is attached to a cover support supporting the cover.

The wiring installation device 10 comprises a support mount 28, a cover support 30, a cover 32, and a wiring retainer 34, as shown in FIGS. 3, 5, and 6. The support mount 28 is attached to the frame members 18 and extends behind the rear side 24 of the wall 20. The cover support 30 is attached to the support mount 28 and extends into the wall hole 22. Together, the support mount 28 and the cover support 30 provide a cover support unit. The cover 32 is configured for movement relative to the cover support 30 between a covered position in which the cover 32 is attached to the cover support 30 and covers the wall hole 22 adjacent the front side 26 of the wall 20 before attachment of the wiring 14 to the system and an uncovered position in which the cover 32 is detached from the cover support 30 and uncovers the wall hole 22 for attachment of the wiring 14 to the system. The wiring retainer 34 is attached to the cover support 30 to retain the wiring 12 adjacent the wall hole 22.

The support mount 28 comprises opposite attachment portions 36 and a central intermediate portion 38 attached to and extending between the attachment portions 36 and attached to the cover support 30, as shown in FIGS. 1–3 and 5. The support mount 28 is, for example, generally rectangular.

Each attachment portion 36 provides a plurality of fastener-receiving holes 40 aligned longitudinally along the support mount 28. Each fastener-receiving hole 40 is configured to receive a fastener 42 (see FIG. 5) for attaching the associated attachment portion 36 to the associated frame member 18. One or more fasteners 42 may be used to attach the associated attachment portion 36 to the associated frame member 18. For example, two fasteners 42 are shown in FIG. 5 for use with each attachment portion 36. Each fastener 42 is, for example, a sheetrock screw. The plurality of fastener-receiving holes 40 are provided in each attachment portion 36 to allow positioning of the intermediate portion 38 and thus the wiring 14 in a variety of locations between the frame members 18. For example, the fasteners 42 may extend through associated holes 40 to position the wiring 12 in a central location between the frame members 18. Optionally, the fasteners 42 may extend through associated holes 40 to position the wiring 12 closer to one of the frame members 18 than the other frame member 18.

The cover support 30 and the support mount 28 are attachable to one another to provide the cover support unit, as shown in FIGS. 1, 2, 5, and 6. The cover support 30 and the support mount 28 are made as separate pieces to be attached to one another during, for example, assembly of the wiring installation device 10. It is within the scope of this disclosure for the cover support 30 and the support mount 28 to be made monolithically with one another as a one-piece construction.

The cover support 30 comprises a sleeve 44 and a flange 46, as shown in FIGS. 2, 3, 5, and 6. The sleeve 44 has a central longitudinal axis 47. The flange is attached to and extends radially outwardly from and around an external surface 48 of the sleeve 44.

The cover support 30 is configured to attach to and extend through the support mount 28. The intermediate portion 38 of the support mount 28 provides a sleeve-receiving hole 50 through which the sleeve 44 extends. The intermediate portion 38 is recessed axially inwardly from the attachment portions 36 to provide a recess 52 receiving the flange 46. The external surface 48 of the sleeve 44 comprises external threads 54 that engage internal threads 56 of the intermediate portion 38 extending in the sleeve-receiving hole 50 to attach the cover support 30 to the support mount 28. The flange 46 contacts the intermediate portion 38 upon engagement between the threads 54, 56. It is within the scope of this disclosure to attach the cover support 30 to the support mount 28 by other mechanisms such as, for example, by snap-fit mechanisms, latch mechanisms, and hook-and-loop mechanisms, to name just a few.

The sleeve 44 comprises a first end portion 58 and a second end portion 60, as shown in FIGS. 2, 5, and 6. The first portion 58 is located to one side of the support mount 28 and the second portion 60 is located to an opposite side of the support mount 28. The first portion 58 extends axially outwardly away from the support mount 28 in the wall hole 22 and provides an end opening 62 through which the cover 32 extends into the sleeve 44. The second portion extends axially inwardly away from the support mount 28.

The wiring retainer 34 comprises an annular wall 64 attached to and positioned within the second portion 60, as shown in FIGS. 1, 3, 5, and 6. The annular wall 64 comprises an outer peripheral region 66 and an inner peripheral region 68. The outer peripheral region 66 is attached to, for example, an end of the second portion 60. The wiring retainer 34 and the sleeve 44 may be made, for example, monolithically with one another as a one-piece construction, as shown in FIGS. 1, 3, 5, and 6, or may be made, for example, as separate pieces to be attached to one another during assembly of the wiring installation device 10.

The inner peripheral region 68 provides a wiring-receiving hole 70 through which the wiring 12 extends axially outwardly into the sleeve 44, as shown in FIGS. 5 and 6. The wiring-receiving hole 70 is sized to prevent withdrawal of the wiring 12 from the sleeve when, for example, the wiring 12 is tied in a knot. The wall 64 may be manufactured with or without the wiring-receiving hole 70. If it is manufactured without the wiring-receiving hole 70, a technician may provide the wiring-receiving hole 70 in the wall 64 during assembly of the wiring installation device 10. In such a case, the technician may provide a smaller hole 70 for smaller wiring 12 and a larger hole 70 for larger wiring 12.

Figure 4:
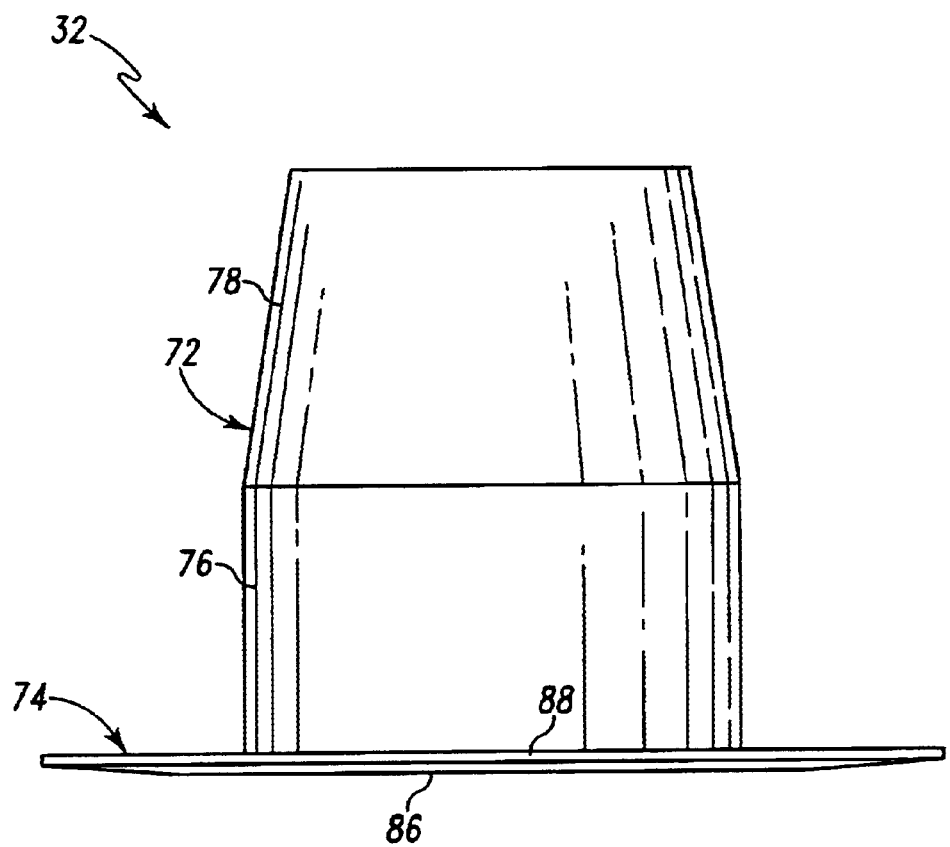
FIG. 4 is an enlarged elevation view of a cover of the wiring installation device.

The cover 32 comprises an attachment portion 72 for extending axially inwardly through the end opening 62 into the sleeve 44 and attaching the cover 32 to the cover support 30 and a cap 74 for covering the wall hole 22 when the cover 32 is positioned in its covered position, as shown in FIGS. 4–6. The attachment portion 72 takes the form of a sleeve comprising a generally non-tapered portion 76 attached to and extending axially inwardly from the cap 74 and a tapered portion 78 attached to and extending axially inwardly and radially inwardly from the non-tapered portion 76.

The sleeve 44 comprises a support mechanism 80 for supporting the cover 32, as shown in FIG. 6. The support mechanism 80 comprises, for example, a first ring 82 and a second ring 84 having a larger cross-section than the first ring 82. The first and second rings 82, 84 extend radially inwardly from an internal surface 86 of the sleeve 44. The first ring 82 is positioned closer to the end opening 62 than the second ring 84. When the cover 32 is attached to the cover support 30, the tapered portion 78 engages the first and second rings 82, 84 to provide an interference fit between the tapered portion 78 and the first and second rings 82, 84.

The attachment portion 72 may also comprise a third ring (not shown) extending radially outwardly from an external surface of the tapered portion 78. The third ring may be press-fitted past one or both of the first and second rings 82, 84 for engagement therewith and/or engagement with the internal surface 86 to attach the cover to the cover support.

The cap 74 comprises a planar central portion 86 and a peripheral portion 88, as shown in FIGS. 4–6. The non-tapered portion 76 of the attachment portion 72 is attached to and extends axially inwardly from the central portion 86. The peripheral portion 88 is attached to and extends radially outwardly from the central portion 86. In the uncovered position, the peripheral portion 88 also extends somewhat axially inwardly from the central portion 86 to promote contact between the peripheral portion 88 and the front side 26 of the wall 20 when the attachment portion 72 is advanced into the sleeve 44. In the covered position, the central and peripheral portions 86, 88 cooperate to cover the wall hole 22. Further, in the covered position, the central and peripheral portions 86, 88 are positioned in generally co-planar relation with one another and the peripheral portion 88 is generally flat against the front side 26 of the wall 20 to present a generally inconspicuous appearance to a casual observer. The cap 74 is, however, noticeable enough to a technician searching for the wiring installation device 10 to facilitate identification of the wiring installation device 10 and thus the wiring 12 for attachment of the wiring 12 to the system.

Figure 7:
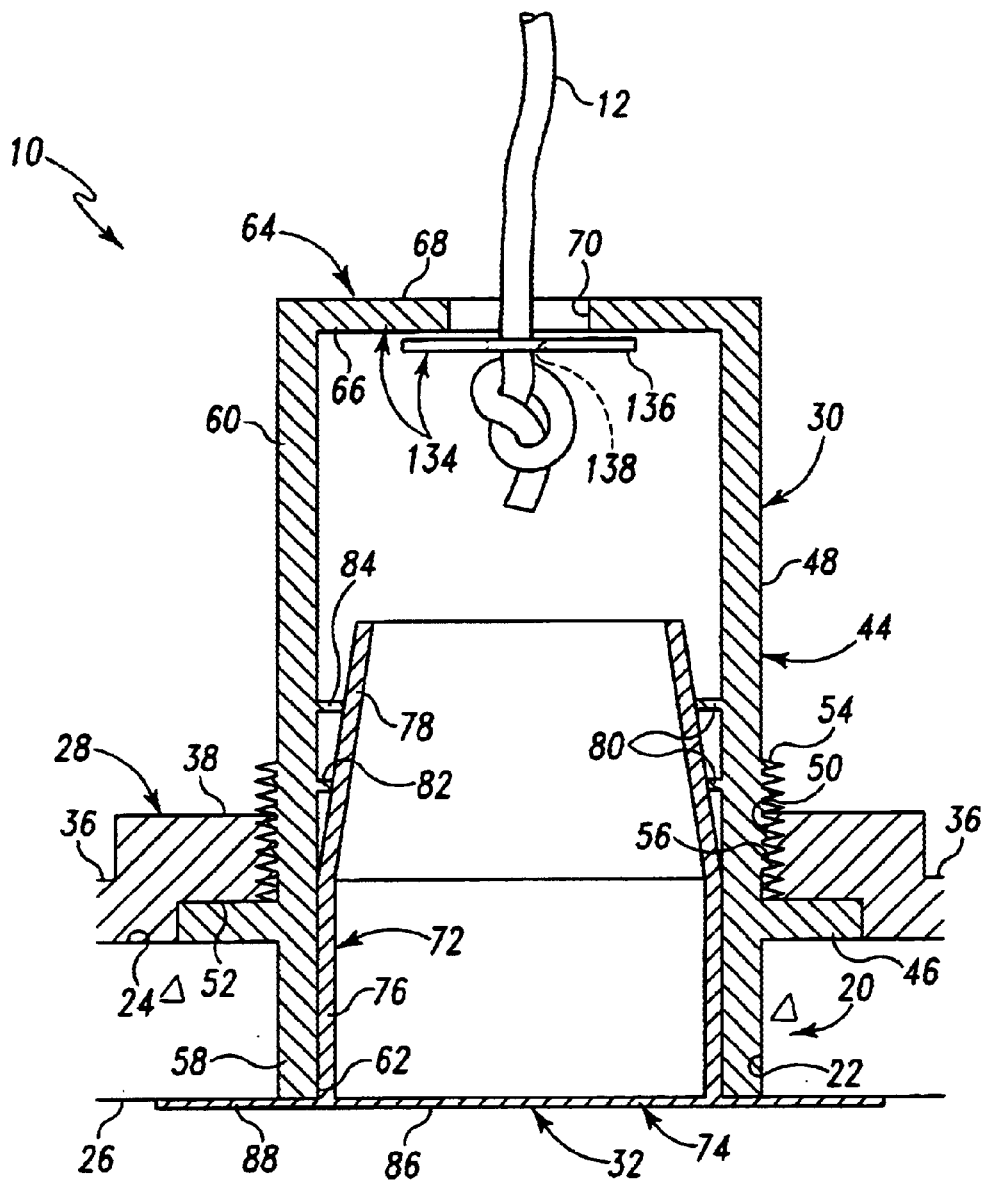
FIG. 7 is an enlarged sectional view similar to FIG. 6 showing the wiring retainer comprising an object (e.g., a washer) attached to the wiring to retain the wiring adjacent the hole.

Another wiring retainer 134 for use with the wiring installation device 10 to retain the wiring 12 adjacent the wall hole 22 is shown in FIG. 7. The wiring retainer 134 comprises the annular wall 64 attached to the sleeve 44 and an object, such as a washer 136. The washer 136 is positioned within the sleeve 44 and the wiring 12 is attached to the washer 136. The washer 136 is larger than the wiring-receiving hole 70 to prevent the wiring 12 from being withdrawn out of the sleeve 44 back through the wiring-receiving hole 70 when the wiring 12 is attached to the washer 136.

The wiring 12 may be attached to the washer 136 in a variety of ways. For example, the wiring 12 may be inserted through a center hole 138 of the washer 136 and tied in a knot to prevent withdrawal of the wiring 12 back through the center hole 138, as shown in FIG. 7. As another example, the wiring 12 may be tied around the washer 136 to attach the wiring thereto.

Figure 8:
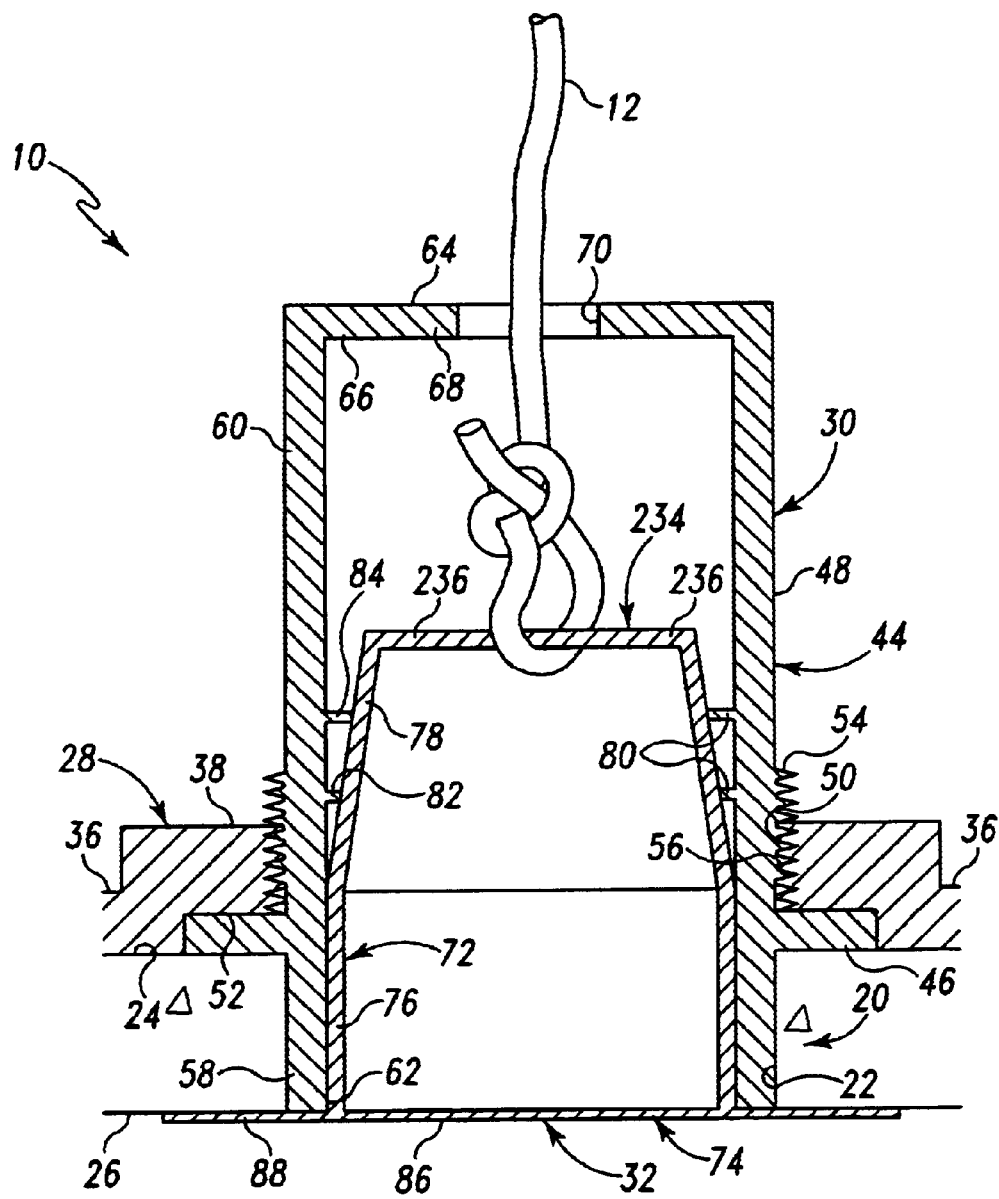
FIG. 8 is an enlarged sectional view similar to FIG. 6 showing the wiring attached to a wiring retainer and showing the wiring retainer attached to the cover.
Figure 9:
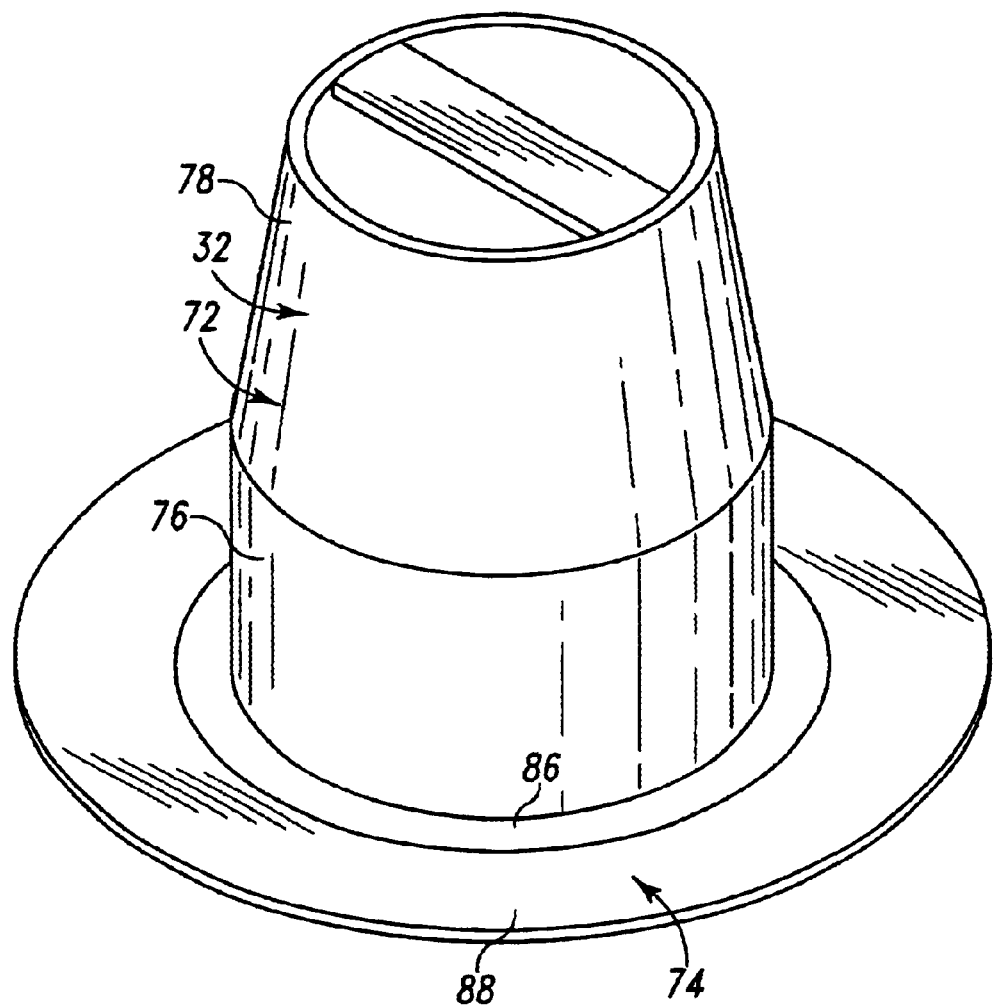
FIG. 9 is a perspective view showing the wiring retainer of FIG. 8 attached to the cover.

Another wiring retainer 234 for use with the wiring installation device 10 to retain the wiring 12 adjacent the wall hole 22 is shown in FIGS. 8–9. The wiring retainer 234 is attached to the cover 32. Exemplarily, the wiring retainer 234 is a bar positioned within the tapered portion 78 of the attachment portion 72 and comprising opposite ends 236 attached to an internal surface of the tapered portion 78. The wiring retainer 234 and the cover 32 may be made monolithically with one another so that the wiring retainer 234 and the cover 32 are of a one-piece construction, or the wiring retainer 234 and the cover 32 may be made as separate pieces attached to one another during assembly of the wiring installation device 10. The wiring 12 is attached to the wiring retainer 234 to retain the wiring 12 adjacent the hole 22 when the cover is positioned in its covered position and to pull the wiring 12 out of the hole 22 when the cover 32 is detached from the cover support 30 during movement from its covered position to its uncovered position.

Some time after installation of the wiring 12 in the facility, it may be desirable to install the system in the facility. As part of installing the system, it may be desirable to attach the wiring 12 to the system. To do so, the cover 32 is located to identify the location of the wiring 12. The wiring 12 is then attached to the system which may be mounted, for example, to the frame 16 or to the wall 20.

If the system is mounted to the frame 16, portions of the wiring installation device 10 and the wall 20 around the wiring installation device 10 may be cut out to accommodate installation of the system. For example, each attachment portion 36 may be cut as a portion of the wall 20 around the cover support 30 and the cover 32 is cut. The cover support 30, the cover 32, and the cut-out portion of the wall 20 may then be removed for installation of the system and attachment of the wiring 12 to the system.

If the system is mounted to the wall 20, the wiring installation device 10 may be left intact for the most part. For example, a hole may be drilled or otherwise provided through the central portion 86 of the cover 32. The wiring 12 may then be advanced through the hole provided in the central portion 86 for attachment to the system mounted to the wall 20.

What is claimed is:

1. A wiring installation device for installing wiring in a facility to facilitate subsequent identification of the location of the wiring for attachment of the wiring to a system to provide a service to the system, the facility comprising a frame and a wall attached to the frame and comprising a front side and a rear side and providing a wall hole extending between the front side and the rear side, the frame comprising a pair of frame members, the wiring installation device comprising a cover support unit configured to be attached to the pair of frame members and to extend behind the rear side of the wall and into the wall hole, a cover configured for movement relative to the cover support unit between a covered position in which the cover is attached to the cover support unit and covers the wall hole adjacent the front side of the wall before attachment of the wiring to the system and an uncovered position in which the cover uncovers the wall hole for attachment of the wiring to the system, and a wiring retainer attached to or configured to be attached to the cover support unit or the cover to retain the wiring adjacent the wall hole, wherein the cover support unit comprises a support mount and a cover support, the support mount comprises a first attachment portion to be attached to a first of the frame members, a second attachment portion to be attached to a second of the frame members, and an intermediate portion attached to the first and second attachment portions and providing a sleeve-receiving hole, the cover support comprises a sleeve configured to be attached to the intermediate portion and to extend through the sleeve-receiving hole such that a first portion of the sleeve is located to one side of the support mount to extend into the wall hole and a second portion of the sleeve is located to an opposite side of the support mount, the first portion of the sleeve comprises an end opening, and the cover is configured to extend through the end opening and attach to the sleeve when the cover is positioned in its covered position.

2. The wiring installation device of claim 1, wherein the intermediate portion is recessed from the first and second attachment portions to provide a recess and comprises internal threads extending into the sleeve-receiving hole, the cover support comprises a flange extending radially outwardly from the sleeve between the first and second portions and configured to be positioned within the recess in contact with the intermediate portion, and the sleeve comprises external threads configured to be attached to the internal threads of the intermediate portion.

3. The wiring installation device of claim 1, wherein the wiring retainer comprises a wall comprising an outer peripheral region and an inner peripheral region, the outer peripheral region is attached to the second portion of the sleeve, the inner peripheral region provides a wiring-receiving hole for the wiring to extend therethrough into the sleeve, and the wiring-receiving hole is smaller than the end opening of the first portion.

4. The wiring installation device of claim 1, wherein the sleeve comprises an internal surface and a ring extending radially inwardly from the internal surface, the cover comprises a second sleeve to extend within the sleeve and engage the ring to provide an interference fit therebetween to attach the cover to the sleeve when the cover is positioned in the covered position, the cover comprises a cap comprising a planar central portion attached to the second sleeve and a peripheral portion attached to the central portion, the peripheral portion extends radially outwardly from the central portion when the cover is positioned in its covered and uncovered positions, and the peripheral portion extends more axially from the central portion when the cover is positioned in its uncovered position than when the cover is positioned in its covered position.

5. The wiring installation device of claim 1, wherein the cover support unit comprises a support mount and a sleeve, the support mount is configured to be attached to the pair of frame members and to be positioned behind the rear side of the wall and provides a sleeve-receiving hole, the sleeve is configured to be attached to the support mount and to extend through the sleeve-receiving hole into the wall hole, the cover comprises a second sleeve to attach to and extend within the sleeve and a cap attached to and extending radially outwardly from the second sleeve to cover the wall hole when the cover is positioned in its covered position, and the wiring retainer comprises a bar positioned within the second sleeve and comprising opposite ends attached to the second sleeve.

6. A wiring installation device for installing wiring in a facility to facilitate subsequent identification of the location of the wiring for attachment of the wiring to a system to provide a service to the system, the facility comprising a frame and a wall attached to the frame and comprising a front side and a rear side and providing a wall hole extending between the front side and the rear side, the frame comprising a pair of frame members, the wiring installation device comprising a support mount configured to be attached to the pair of frame members and to extend behind the rear side of the wall, a cover support attached to the support mount to extend in the wall hole, a wiring retainer attached to the cover support to retain the wiring adjacent the wall hole, and a cover configured for movement relative to the cover support between a covered position in which the cover is attached to the cover support and covers the wall hole adjacent the front side of the wall before attachment of the wiring to the system and an uncovered position in which the cover uncovers the wall hole for attachment of the wiring to the system, wherein the support mount provides a sleeve-receiving hole, the cover support comprises a sleeve extending through the sleeve-receiving hole such that a first portion of the sleeve is located to one side of the support mount to extend into the wall hole and a second portion of the sleeve is located to an opposite side of the support mount, and the wiring retainer is attached to the second portion of the sleeve.

7. The wiring installation device of claim 6, wherein the wiring retainer comprises an annular wall attached to the second portion of the sleeve and providing a wiring-receiving hole for the wiring to extend therethrough into the sleeve, and the annular wall is configured to retain the wiring within the sleeve.

8. The wiring installation device of claim 7, wherein the wiring retainer comprises an object positioned within the sleeve and sized larger than the wiring-receiving hole to prevent the wiring from withdrawing out of the sleeve through the wiring-receiving hole when the wiring is attached to the object.

9. The wiring installation device of claim 6, wherein the support mount comprises a first attachment portion to be attached to a first of the frame members, a second attachment portion to be attached to a second of the frame members, and an intermediate portion providing the sleeve-receiving hole and attached to and recessed from the first and second attachment portions to provide a recess, and the cover support comprises a flange extending radially outwardly from the sleeve and positioned within the recess in contact with the intermediate portion of the support mount.

10. A wiring installation device for installing wiring in a facility to facilitate subsequent identification of the location of the wiring for attachment of the wiring to a system to provide a service to the system, the facility comprising a frame and a wall attached to the frame and comprising a front side and a rear side and providing a wall hole extending between the front side and the rear side, the frame comprising a pair of frame members, the wiring installation device comprising a support mount configured to be attached to the pair of frame members and to extend behind the rear side of the wall, a cover support attached to the support mount to extend in the wall hole, a wiring retainer attached to the cover support to retain the wiring adjacent the wall hole, and a cover configured for movement relative to the cover support between a covered position in which the cover is attached to the cover support and covers the wall hole adjacent the front side of the wall before attachment of the wiring to the system and an uncovered position in which the cover uncovers the wall hole for attachment of the wiring to the system, wherein the cover support comprises a sleeve attached to the support mount to extend in the wall hole, the cover comprises an attachment portion attached to and extending within the sleeve and a cap attached to and extending radially outwardly from the attachment portion to cover the wall hole when the cover is positioned in the covered position.

11. The wiring installation device of claim 10, wherein the sleeve comprises an internal surface, a first ring extending radially inwardly from the internal surface, and a second ring extending radially inwardly from the internal surface and having a cross-section larger than the first ring, the attachment portion comprises a tapered portion engaging the first and second rings to provide an interference fit between the tapered portion and the first and second rings to attach the cover to the sleeve when the cover is positioned in the covered position, and the cap comprises a planar central portion attached to the attachment portion and a peripheral portion attached to the central portion, the peripheral portion extends radially outwardly from the central portion when the cover is positioned in its covered and uncovered positions, and the peripheral portion extends more axially from the central portion when the cover is positioned in its uncovered position than when the cover is positioned in its covered position.

12. A wiring installation device for installing wiring in a facility to facilitate subsequent identification of the location of the wiring for attachment of the wiring to a system to provide a service to the system, the facility comprising a frame and a wall attached to the frame and comprising a front side and a rear side and providing a wall hole extending between the front side and the rear side, the frame comprising a pair of frame members, the wiring installation device comprising a support mount configured to be attached to the pair of frame members and to extend behind the rear side of the wall, a cover support attached to the support mount to extend in the wall hole, a cover configured for movement relative to the cover support between a covered position in which the cover is attached to the cover support and covers the wall hole adjacent the front side of the wall and an uncovered position in which the cover uncovers the wall hole and a wiring retainer attached to the cover to retain the wiring adjacent the wall hole when the cover is positioned in its covered position before attachment of the wiring to the system and to pull the wiring relative to the wall hole when the cover is moved from its covered position to its uncovered position for attachment of the wiring to the system, wherein the support mount provides a sleeve-receiving hole, the cover support comprises a sleeve extending through the sleeve-receiving hole such that a first portion of the sleeve is located to one side of the support mount to extend into the wall hole and a second portion of the sleeve is located to an opposite side of the support mount, and the wiring retainer is attached to the second portion of the sleeve.

13. The wiring installation device of claim 12, wherein the support mount comprises a first attachment portion to be attached to a first of the frame members, a second attachment portion to be attached to a second of the frame members, and an intermediate portion providing the sleeve-receiving hole and attached to and recessed from the first and second attachment portions to provide a recess, and the cover support comprises a flange extending radially outwardly from the sleeve and positioned within the recess in contact with the intermediate portion of the support mount.

14. A wiring installation device for installing wiring in a facility to facilitate subsequent identification of the location of the wiring for attachment of the wiring to a system to provide a service to the system, the facility comprising a frame and a wall attached to the frame and comprising a front side and a rear side and providing a wall hole extending between the front side and the rear side, the frame comprising a pair of frame members, the wiring installation device comprising a support mount configured to be attached to the pair of frame members and to extend behind the rear side of the wall, a cover support attached to the support mount to extend in the wall hole.

a cover configured for movement relative to the cover support between a covered position in which the cover is attached to the cover support and covers the wall hole adjacent the front side of the wall and an uncovered position in which the cover uncovers the wall hole and a wiring retainer attached to the cover to retain the wiring adjacent the wall hole when the cover is positioned in its covered position before attachment of the wiring to the system and to pull the wiring relative to the wall hole when the cover is moved from its covered position to its uncovered position for attachment of the wiring to the system, wherein the cover support comprises a sleeve attached to the support mount to extend in the wall hole, and the cover comprises an attachment portion attached to and extending within the sleeve and a cap attached to and extending radially outwardly from the attachment portion to cover the wall hole when the cover is positioned in the covered position.

15. The wiring installation device of claim 14, wherein the sleeve comprises an internal surface, a first ring extending radially inwardly from the internal surface, and a second ring extending radially inwardly from the internal surface and having a cross-section larger than the first ring, the attachment portion comprises a tapered portion engaging the first and second rings to provide an interference fit between the tapered portion and the first and second rings to attach the cover to the sleeve when the cover is positioned in the covered position, and the cap comprises a planar central portion attached to the attachment portion and a peripheral portion attached to the central portion, the peripheral portion extends radially outwardly from the central portion when the cover is positioned in its covered and uncovered positions, and the peripheral portion extends more axially from the central portion when the cover is positioned in its uncovered position than when the cover is positioned in its covered position.

16. The wiring installation device of claim 14, wherein the attachment portion comprises a second sleeve attached to and extending within the sleeve of the cover support, and the wiring retainer is attached to and positioned within the second sleeve.

17. The wiring installation device of claim 16, wherein the wiring retainer comprises a bar comprising opposite ends attached to the second sleeve.

* * * * *